United States Patent Office 3,759,765
Patented Sept. 18, 1973

3,759,765
GAS-PRODUCING COMPOSITIONS
George Harold Sidney Young, Enfield, England, assignor to Minister of Aviation, in Her Majesty's Government of the United Kingdom of Great Britain and Northern Ireland, London, England
No Drawing. Filed May 23, 1961, Ser. No. 112,118
Int. Cl. C06d 5/06
U.S. Cl. 149—19.91
4 Claims The present invention relates to gas-producing compositions, which may be used in rocket motors, fluid ejection systems, pressuring systems, engine starter cartridges and like devices in which gas is required to be generated under pressure.

The object of the invention is to provide plastic gas-producing compositions which have a relatively high performance including compositions having a relatively slow burning rate so that gas-producing devices using these compositions can be made which are robust, serviceable and of convenient shape.

Plastic gas-producing compositions may be produced containing between about 8–20% of a visco-elastic binder having a viscosity between 250,000 and 7,000,000 poises, preferably between 400,000 and 1,000,000 poises, at 25° C., which binder is a polymeric alkene having side groups, for example, polyisobutene and polypropene. These visco-elastic binders are highly viscous liquids which also, especially at low temperatures, have elastic properties.

I have now discovered that it is possible to incorporate a high explosive into such gas-producing compositions to produce slow burning gas-producing compositions having an improved performance.

In accordance with the invention, a gas-producing composition based on a visco-elastic binder as above described, contains appreciable amounts of a solid high explosive of near oxygen-balance and a solid organic moderator which on combustion produce, in combination, gases which are slightly oxygen deficient. These solid high explosives and the organic moderating substances should be in particle form and preferably have melting points above 90° C. Examples of such high explosives are cyclic polymethylene-polynitramines such as R.D.X. (cyclo-trimethylene-trinitramine, cyclonite or hexogen) and H.M.X. (cyclo-tetramethylene-tetranitramine). Particular examples of suitable solid organic moderating substances, which are oxygen deficient and in general produce gases containing substantial quantities of nitrogen, are nitroguanidine, oxamide, melamine, 1:3-dinitro-1:3-diazacyclopentane and diphenylglycol uril.

A general composition A is as follows:

| | Percent |
|---|---|
| Cyclic polymethylene-polynitramine | 82–34 |
| Moderating solid organic substance | 5–15 |
| Oxidising agents | 0–30 |
| Visco-elastic binder | 8–20 |

1% of a surface active agent may preferably be incorporated.

A particular composition B is an follows:

| | Percent |
|---|---|
| R.D.X. and moderating substance | 78 |
| Ammonium perchlorate | 10 |
| Polyisobutene | 11 |
| Surface active agent | 1 | and has a rate of burning of 0.14 inch/sec. at 1000 lb./sq. inch with a pressure exponent of about 0.7 and calculated specific impulse of 229 lb. sec./lb.

In composition A when present, and in composition B and various compositions to be hereinafter described the surface active agent may be lecithin or a surface active agent S which has a composition as follows:

| | Percent |
|---|---|
| Pentaerythritol dioleate | 30 |
| Ethyl oleate | 40 |
| Sodium dioctyl sulphosuccinate | 30 |

Either of the octyl groups in the last component may be in an isomeric form such as di-2-ethyl hexyl.

The moderator serves to lower the pressure exponent of the burning rate of the composition. Thus, if R.D.X. is used alone with, for example, polyisobutene binder and a surface active agent, the resulting mixture is slow burning but its pressure exponent lies between 0.7 and 1.0. The composition is consequently unsuitable for the purpose of gas-producing but may be used as a detonating explosive.

The rate of burning is increased by an increase in the amount of oxidising agent present, for example, with 20% ammonium perchlorate and 11% polyisobutene, a composition of type A burns at 0.21 inch/sec. at 1000 lb./sq. inch.

A method of increasing performance is to add a solid combustible element with a high heat of combustion. Examples of such elements are aluminium, magnesium, zirconium, silicon or boron. The resulting compositions, without an oxidising agent, type C, are as follows:

| | Percent |
|---|---|
| R.D.X. or other high explosive (and moderator) | 87–54 |
| Solid element (aluminium) | 2–25 |
| Visco-elastic binder | 10–20 |
| Surface active agent | 1 |

To assist in the combustion of the aluminium or similar element, it is preferable for part of the high explosive such as R.D.X. to be replaced by an oxidising agent such as ammonium perchlorate and/or by a moderator as in composition type A. A typical composition, type D, is as follows:

| | Percent |
|---|---|
| Cyclic polymethylene-polynitramine | 75–25 |
| Solid element | 2–25 |
| Oxidising agent | 10–30 |
| Visco-elastic binder | 10–20 |
| Lecithin or surface active agent S | 1 |

Compositions of types C and D (when aluminium, ammonium perchlorate and polyisobutene are used) have calculated specific impulses of between 245 and 265 lb.s./lb. The rate of burning of type C is between 0.1 and 0.2 inch/sec. at a pressure of 1000 lb./sq. inch. Type D burns somewhat faster, in proportion to the ammonium perchlorate content.

Although, as so far described, high performance compositions contain ammonium perchlorate, compositions of general type A in which the oxidising agent (ammonium perchlorate) content has been entirely replaced by R.D.X. and a moderator have advantageous properties.

A general composition, type E, is as follows:

| | Percent |
|---|---|
| Cyclic polymethylene-polynitramine | 82–69 |
| Moderating solid organic substance | 5–15 |
| Visco-elastic binder | 12–15 |
| Surface active agent | 1 |

A particular composition F is as follows:

| | |
|---|---|
| R.D.X. | 70 |
| 1:3-dinitro-1:3-diazacyclopentane and/or diphenylglycol uril | 15 |
| Polyisobutene | 14 |
| Lecithin or surface active agent S | 1 |

Composition F has a rate of burning of 0.08 inch/s. at 1000 lb./sq. in. and a pressure exponent of 0.40–0.80, dependent on the pressure of operation.

As compositions of type E contain no ammonium perchlorate, they burn without producing corrosive hydrochloric acid in the products. They are in consequence relatively smokeless and the gases produced are similar in chemical composition to the gases produced by burning a nitroglycerine/nitrocellulose (cordite) propellant. Compositions of type E are therefore particularly suited for gas generation devices. When manufactured in accordance with procedures now to be described they are also relatively insensitive to friction and impact.

Ammonium perchlorate is very sensitive to impact and friction when used in contact with organic substances. R.D.X. is also sensitive and an important feature of the present invention is the provision of a practical process for the manufacture of compositions containing both a sensitive high explosive such as R.D.X. and a sensitive oxidising agent such as ammonium perchlorate.

In accordance with this feature of the invention, a process for manufacturing a gas-producing composition consists essentially of coating R.D.X., or similar high explosive, with a visco-elastic binder to form a mixture of high explosive and binder; forming a mixture of ammonium perchlorate and binder; and finally mixing together the two said mixtures in predetermined proportions together with further binder, if necessary, to form a desired composition.

Details of a typical manufacturing process, using polyisobutene binder as previously described, are as follows:

The R.D.X., or other similar high explosive, is maintained in a water-slurry and is then coated with about 10% polyisobutene at the temperature of boiling water by the well established process known as "oiling" used conventionally in the production of plastic explosive and R.D.X. desensitized by wax. A rather crumbly product results, which is considerably desensitized. This is converted into a form suitable for use in the plastic gas-producing composition by the addition of further polyisobutene to a content of about 13–19% together with 1% of a surface active agent such as lecithin or the surface active agent S. This mixing is carried out in a conventional incorporator at 140° F.

The ammonium perchlorate, other compounds, or elements as required by the particular examples quoted are then prepared and dried in accordance with processes described in patent application No. 689,245 or those commonly used in the art. The requisite amount of these materials is then mixed with polyisobutene (approximately 10%) in a standard incorporator and the resultant plastic material is then added to the desensitized R.D.X./polymer mixture. Additional polyisobutene may also be added to ensure that the final mixture has adequate physical properties. This final mixing may be carried out at a temperature of 140–200° F. in a standard heavy duty incorporator, fitted with sigma-type or masticator-type blades. After mixing for a time adequate to ensure a homogeneous mix, the material is de-aerated and filled, under vacuum, into the device or container in which it is to be used by extrusion or pressing in a manner similar to that described in patent application No. 689,245.

I claim:

1. A process for manufacturing a gas-producing composition containing both a cyclic polymethylene-polynitramine high explosive and ammonium perchlorate, and comprising the steps of coating the said high explosive with a visco-elastic binder having a viscosity between 250,000 and 7,000,000 poises at 25° C. selected from the group consisting of polyisobutene and polypropene to form a mixture of the high explosive and binder, forming separately a mixture of ammonium perchlorate and said visco-elastic binder, and finally mixing together the two so formed mixtures in predetermined proportions together with further binder, if necessary, to form a predetermined composition.

2. A gas producing composition consisting essentially of a cyclic polymethylene-polynitramine explosive, a moderating solid organic substance which is oxygen deficient and produces gases containing substantial quantities of nitrogen, said organic substance selected from the group consisting of nitroguanidine, oxamide, 1:3-dinitro-1:3-diazacyclopentane and diphenylglycol uril, a surface active agent of lecithin and a visco-elastic binder having a viscosity between 250,000 and 7,000,000 poises at 25° C. and which is a polymeric alkene having side groups.

3. A gas producing composition consisting essentially of between 34–82% of a cyclic polymethylene-polynitramine explosive, between 5–15% of a moderating solid organic substance which is oxygen deficient and produces gases containing substantial quantities of nitrogen selected from the group consisting of nitroguanidine, oxamide, 1-3-dinitro-1-3-diazacyclopentane and diphenylglycol uril, up to approximately 30% of ammonium perchlorate as an oxidizing agent, 1% lecithin as a surface active agent and from 8–20% of a visco-elastic binder having a viscosity between 250,000 and 7,000,000 poises at 25° C. and is a polymeric alkene having side groups.

4. A gas-producing composition consisting essentially of between 25–75% of a cyclic polymethylene-polynitramine high explosive and a moderating solid organic substance which is oxygen deficient and produces gases containing substantial quantities of nitrogen selected from the group consisting of nitroguanidine, oxamide, 1-3-dinitro-1-3-diazacyclopentane and diphenylglycol uril, from 2–25% of a solid combustible element with a high heat of combustion for increased performance selected from a group consisting of aluminum, magnesium, zirconium, silicon and boron, between 10–30% of ammonium perchlorate as an oxidizing agent, 1% lecithin as a surface active agent and between 10–20% of a visco-elastic binder having a viscosity between 250,000 and 7,000,000 poises at 25° C. selected from the group consisting of polyisobutene and polypropene.

References Cited

UNITED STATES PATENTS

| | | | |
|---|---|---|---|
| 2,411,604 | 11/1946 | Wahl | 149—92 |
| 2,999,743 | 9/1961 | Breza et al. | 149—92 |
| 3,000,719 | 9/1961 | Gold et al. | 149—92 |
| 3,000,720 | 9/1961 | Baer et al. | 149—92 |
| 3,073,730 | 1/1963 | Doe | 149—19 |
| 3,117,044 | 1/1964 | Sauer | 149—19 |

FOREIGN PATENTS

| | | | |
|---|---|---|---|
| 1,093,717 | 11/1960 | Germany | 149—92 |

BENJAMIN R. PADGETT, Primary Examiner

U.S. Cl. X.R.

149—11, 19.93, 20, 22, 38; 264—3 B